United States Patent

[11] 3,566,764

[72] Inventors Dieter Maas
Munich;
Richard Schmierl, Uterhaching near
Munich; Guenter Heidrich, Munich,
Germany
[21] Appl. No. 715,058
[22] Filed Mar. 21, 1968
[45] Patented Mar. 2, 1971
[73] Assignee AGFA-Gevaert Aktiengesellschaft
Leverkusen, Germany
[32] Priority Mar. 31, 1967
[33] Germany
[31] A55314

[54] DRIVE MECHANISM FOR ROTATABLE FLASH ATTACHMENT
9 Claims, 3 Drawing Figs.
[52] U.S. Cl. .................................................. 95/11,
240/1.3, 240/37.1
[51] Int. Cl. ................................................. G03b 19/00
[50] Field of Search ......................................... 240/1.3, 37,
37.1; 95/11, 11.5, 11 (M)

[56] References Cited
UNITED STATES PATENTS
3,335,651 8/1967 Williams et al. ............ 240/37.1(X)

| | | | |
|---|---|---|---|
| 3,353,468 | 11/1967 | Beach.................. | 240/37.1(X) |
| 3,463,067 | 8/1969 | Fauth et al.............. | 240/1.3(X) |
| 3,319,547 | 5/1967 | Parsons et al............. | 240/1.3X |
| 3,369,468 | 2/1968 | Sapp, Jr., et al. ......... | 95/11.5 |
| 3,443,497 | 5/1969 | Bihlmaier................. | 240/1.3X |

*Primary Examiner*—John M. Horan
*Assistant Examiner*—Robert P. Greiner
*Attorney*—Michael S. Striker ABSTRACT: A photographic camera which has a built-in indexible socket for receiving the plug of a multiple flash bulb holder. The socket is held against rotation in one direction by a one-way clutch including a ratchet wheel which is affixed to the socket and a spring-biased pawl which is mounted in the housing. The mechanism for indexing the socket in the opposite direction includes a shaft which forms part of the film transporting mechanism and carries an eccentric crank pin which reciprocates a crank arm. The crank arm turns the socket in the opposite direction by way of a friction coupling including a cylinder coaxially affixed to the socket and a leaf spring which engages and partially surrounds the peripheral surface of the cylinder and is connected to one end of the crank arm.

Patented March 2, 1971
3,566,764
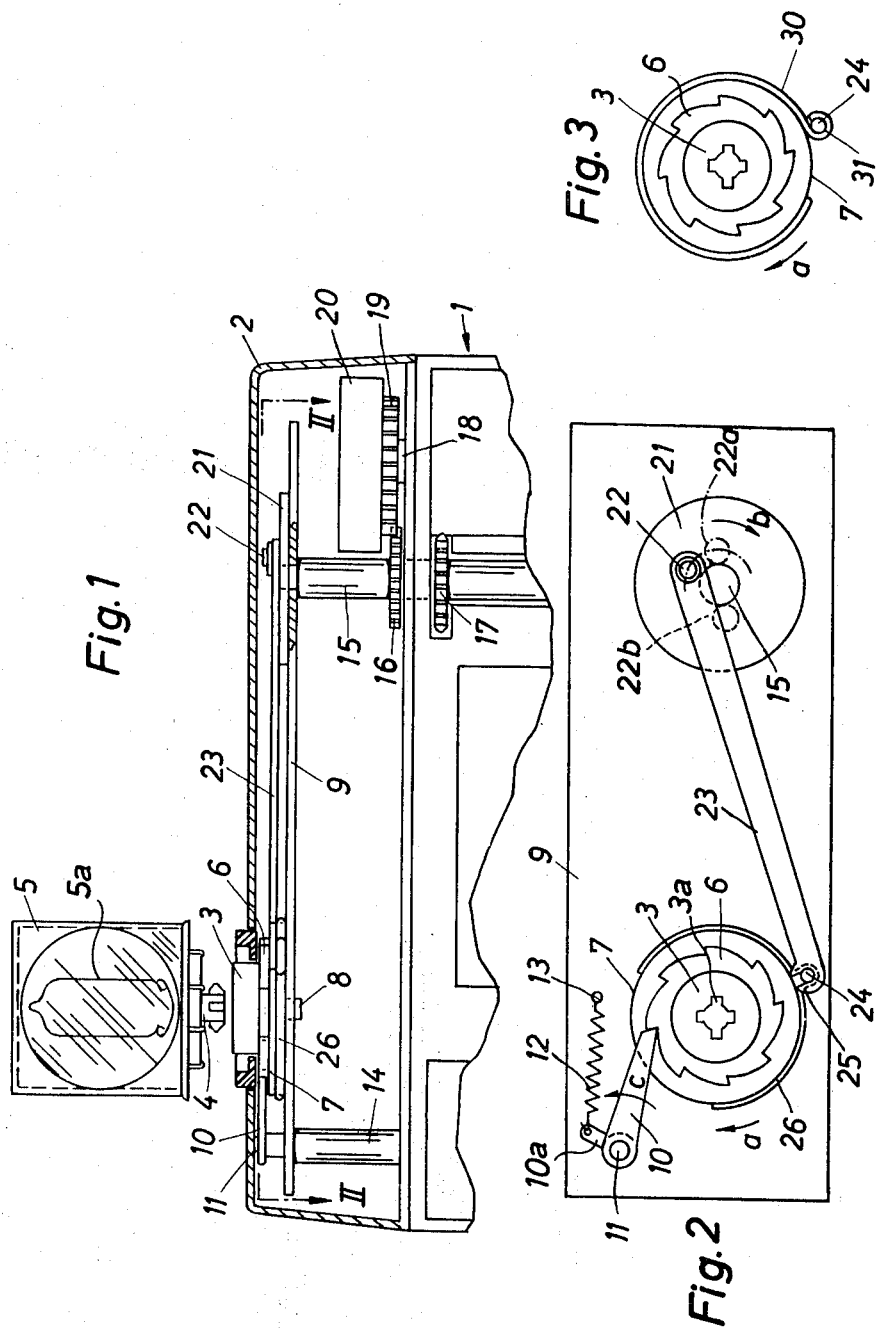
INVENTOR.
DIETER MAAS
RICHARD SCHMIERL
GÜNTHER HEIDRICH
BY Michael S. Striker
Attorney

DRIVE MECHANISM FOR ROTATABLE FLASH ATTACHMENT

BACKGROUND OF THE INVENTION

The present invention relates to photographic cameras in general, and more particularly to improvements in cameras which are provided with built-in illuminating means, especially with a built-in flash unit which can employ "Flashcubes" or analogous expendable multiple flash bulb holders. Such cameras comprise a socket which is rotatably mounted in the housing of the camera and is indexible through angles of predetermined magnitude to place successive unfired flash bulbs of a multiple flash bulb holder into an optimum position for illumination of the subject. As a rule, the socket is indexible in automatic response to operation of the film transporting mechanism, in response to cocking of the shutter, or in response to release of the shutter so that a fresh flash bulb faces the subject when the camera is ready to make an exposure.

SUMMARY OF THE INVENTION

It is an object of our invention to provide a photographic camera wherein the built in illuminating means comprises a rotary indexible member and to construct and assemble the devices which rotate the indexible member in such a way that they occupy little room, that they occupy room which is normally available in a camera, and that they do not interfere with the mounting and/or operation of other components in the camera.

Another object of the invention is to provide a camera wherein the indexible member of a built-in flash unit can be indexed by a small number of simple, inexpensive and compact parts which can be mass-produced in available machinery.

A further object of the invention is to provide a novel and improved motion transmitting connection between the film transporting mechanism of a camera and the indexible socket for the plug of a multiple flash bulb holder.

An additional object of the invention is to provide a motion transmitting connection which occupies so little room that it can be installed in the housing of a photographic camera at a level above the view finder, range finder, exposure meter and other parts which are normally mounted above the film cartridge without adding to the bulk of the housing and without contributing appreciably to the weight of the camera.

Another object of the invention is to provide a still camera for use with "flashcubes" or like multiple flash bulb holders wherein the multiple flash bulb holder is indexed through an angle of predetermined magnitude in automatic response to a manipulation which must be carried out in order to prepare the camera for an exposure.

The improved camera comprises a housing, illuminating means including an indexible member rotatably mounted in the housing and adapted to engage and index a "Flashcube" or an analogous multiple flash bulb holder, one-way clutch means provided in the housing to hold the indexible member against rotation in a first direction, and means for rotating the indexible member in the opposite direction through angles of predetermined magnitude, for example, through 90°. The rotating means includes a drive which may constitute the film transporting mechanism and/or the shutter cocking mechanism and includes a rotary output member journaled in the housing at a point remote from the indexible member, a flat crank unit which receives motion from the output member, and friction coupling means interposed between the crank unit and the indexible member. The crank unit comprises a flat crank arm one end of which is arranged to orbit about the axis of the output member and the other end of which is connected with an elastic clamp which forms part of the friction coupling means. The latter further comprises a cylindrical coupling element which is rigid with the indexible member and has a peripheral surface frictionally engaged by the clamp so that the clamp rotates the indexible member in the other direction but slides with reference to the cylindrical coupling element when it is caused by the crank arm to turn in the first direction.

The novel features which are considered as characteristic of the invention are set forth in particular in the appended claims. The improved camera itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

FIG. 1 is a fragmentary longitudinal vertical sectional view of a photographic camera with built-in illuminating means which embodies one form of our invention;

FIG. 2 is a top plan view as seen in the direction of arrows from the line II–II of FIG. 1; and FIG. 3 is a top plan view of a detail in a modified camera.

DESCRIPTION OF THE PREFERRED EMBODIMENTS

FIG. 1 and 2 illustrate a portion of a still camera which comprises a housing including a lower portion or body 1 and an upper portion of cap 2. The top wall of the cap 2 has an aperture accommodating a portion of a rotary indexible socket 3 having a centrally located cruciform recess 3a adapted to receive the plug 4 of a commercially available multiple flash bulb holder 5 commonly known as "Flashcube." The socket 3 is rigid with a coaxial ratchet wheel 6 which forms part of a one-way clutch and cooperates with a pawl 10 turntable on a pivot pin 11 which is mounted in an intermediate wall or plate 9 accommodated in the interior of the cap 2. The socket 3 is further rigid with a coaxial cylindrical coupling element 7 and is mounted on a short shaft 8 journaled in the plate 9. The pawl 10 has a lug 10a which is engaged by one end of a helical clutch spring 12. The other end of the spring 12 is affixed to a post 13 on the plate 9. The purpose of this spring is to urge the pallet of the pawl 10 against the teeth of the ratchet wheel 6 and to thus prevent counterclockwise rotation of the socket 3 (See FIG. 2). When the socket 3 is caused to rotate in a clockwise direction (arrow a), the pallet of the pawl 10 merely rides over the teeth of the ratchet wheel 6.

The pivot pin 11 is rigid with the upper end of a bolt 14 which secured one end of the plate 9 to the body 1. The other end of the plate 9 is supported by the output shaft 15 of a drive for the socket 3. The output shaft 15 is rotatable with reference to but cannot move axially in the body 1. The drive further comprises a pinion 16 which is rigid with the output shaft 15, a gear 19 which meshes with the pinion 16, and a knurled or milled actuating wheel 20 a portion of which extends through a slot in the cap 2 so that it can be rotated by hand. The gear 19 and wheel 20 are rotatable on or with a shaft 18 which is mounted in the body 1. In the embodiment of FIGS. 1 and 2, the drive which indexes the socket 3 constitutes a film transporting mechanism and further includes a sprocket wheel 17 mounted on the shaft 15. The teeth of the sprocket wheel 17 enter the perforations in a roll film (not shown) and advance the film lengthwise in response to clockwise rotation of the shaft 15. The wheel 20 can be rotated by a customary lever or by an electric motor or spring motor, not shown. Furthermore, the just mentioned drive can be used to cock the shutter (not shown) in addition to or instead of transporting the film, and/or to transmit motion to one or more additional movable parts of the camera, for example, to a film frame counter.

The aforementioned coupling element 7 forms part of a friction coupling which further includes a second element in the form of a resilient clamp 26 surrounding a substantial portion of the peripheral surface on the coupling element 7. The transmission which can rotate the socket 3 in response to operation of the drive and by way of the friction coupling 7, 26 comprises a crank unit having a disc-shaped carrier 21 fixed to the shaft 15 at a level above the plate 9, a crank pin 22 eccentrically mounted on the carrier 21, an elongated flat crank arm 23 one end of which is turnable on the pin 22, and a pin 24 which connects an eye 25 of the clamp 26 with the other end of the crank arm 23. In the embodiment of FIGS. 1 and 2, the clamp 26 consists of a length of suitably shaped leaf spring material having two arcuate arms in requisite frictional engagement with the peripheral surface of the coupling element 7. The friction coupling including the elements 7, 26 occupies very little room and its compactness can be improved still further by shortening the coupling element 7 and by replacing the clamp 26 with one consisting of round spring steel stock. The friction coupling is installed in the narrow space between the top wall of the cap 2 and the upper side of the plate 9. This narrow space further accommodates the aforementioned crank unit including the parts 21 to 24. If desired, the friction coupling and the crank unit can be accommodated in the space between the plate 9 and the top wall of the body 1, for example, in the region directly above the top wall of the body. Regardless of the exact location of these assemblies, there remains ample room for installation of other camera components in the area enclosed by the cap 2. Such components may included a view finder, a range finder, an exposure meter, a frame counter, a synchronizing switch and/or other parts of the illuminating arrangement which includes the socket 3.

In the embodiment of FIGS. 1 and 2, the socket 3 must be turned through 90° or through a multiple of 90° in order to place successive or selected flash bulbs 5a into an optimum position for illumination of the subject. The ratchet wheel 6 has eight teeth and the output shaft 15 must be turned through 720° in order to place a fresh (unexposed) film frame into registry with the optical system of the camera. The ratio between the gears 19, 16 can be selected in such a way that the wheel 20 must complete one full revolution in order to rotate the shaft 15 through two complete revolutions and to thereby advance the film by the length of a frame. Furthermore, the aforementioned crank unit must turn the socket 3 through 90° in response to each angular displacement of the shaft 15 through 720°. The direction in which the shaft 15 must rotate in order to advance the film from the supply reel to the takeup reel or from a supply cartridge to a takeup cartridge is indicated by arrow b. The carrier 21 of the crank unit shares all angular movements of the shaft 15 and orbits about the axis of this shaft.

The operation is as follows:

Prior to rotation of the actuating wheel 20 by hand, the carrier 21 assumes the angular position shown in FIG. 2. If the user thereupon rotates the wheel 20 in a counterclockwise direction, the gear 19 rotates the pinion 16 in a clockwise direction (arrow b). During the initial stage of rotation of pinion 16 and shaft 15 in a clockwise direction, the eccentric crank pin 22 moves from the solid-line position to the phantom-line position 22a of FIG. 2 whereby the crank arm 23 turns the clamp 26 in a counterclockwise direction so that the internal surface of the clamp 26 slides with reference to the peripheral surface of the coupling element 7 because the pallet of the pawl 10 cooperates with the adjoining tooth of the ratchet wheel 6 to prevent rotation of the socket 3 in a counterclockwise direction. As the wheel 20 continues to rotate the carrier 21 in a clockwise direction, the crank pin 22 moves beyond the phantom-line position 22a and moves the crank arm 23 in a direction to the left, as viewed in FIG. 2, so that the pin 24 turns the clamp 26 in the direction indicated by arrow a. The coupling element 6 rotates the socket 3 in the same direction until the crank pin 22 reaches the broken-line position 22b. From thereon, the clamp 26 turns in a counterclockwise direction while the crank pin 22 moves back toward the position 22a. During travel of the pin 22 from the position 22a to the position 22a to the position 22b, the friction coupling including the elements 7 and 26 turns to the socket 3 through 45°. This socket is turned through another 45° during the immediately following second revolution of the shaft 15 and carrier 21. When the socket 3 rotates in the direction indicated by arrow a, the pawl 10 turns in the direction indicated by arrow a, the pawl 10 turns in the direction indicated by arrow c and its pulley falls behind a radial flank of the radial flank of the adjoining tooth on the ratchet wheel 6 as soon as the socket turns through 45°.

During the last stage of rotation of the shaft 15 and carrier 21 through 720°, the crank pin 22 travels from the broken-line position 22b toward the solid-line position of FIG. 2 (arrow b) so that the clamp 26 then turns with reference to the coupling element 7 and causes the pallet of the pawl 10 to bear against the radial flank on the adjoining tooth of the ratchet wheel 6. This is desirable because the socket 3 is automatically fixed in angular position in which a fresh flash bulb 5a faces the subject, i,e., in which the socket assumes an annular position turned by exactly 90° with reference to its previous angular position.

It is clear that the crank unit 21—24 can be modified in a number of ways without departing form the spirit of our invention. For example, the throw of the crank arm 23 can be selected in such a way that rotation of the output shaft 15 and carrier 21 through a single revolution suffices to advance the film by the length of a frame and to turn the socket 3 by 90°. Also, the multiple flash bulb holder 5 can be replaced by other types of holders which contain only two, three or five, six or more flash bulbs. The socket 3 is then indexed through angles of 360/m °wherein m is the number of flash bulbs in the holder.

FIG. 83 illustrates a portion of a modified photographic camera wherein the clamp 26 of FIGS. 1—2 is replaced by a substantially ring-shaped clamp 30 having an eye 31 at one end and surrounding the major part of the peripheral surface on the cylindrical coupling element 7. The manner in which the socket 3 is assembled with the coupling element 7 and ratchet wheel 6 is the same as described in connection with FIGS. 1 and 2. The eye 31 of the clamp 30 receives the pin 24 at one end of the crank arm 23 (not shown in FIG. 3). Starting from the eye 31, the clamp 30 is convoluted around the peripheral surface of the coupling element 7 in a counterclockwise direction, i.e., in a direction counter to that (arrow a) in which the socket 3 can turn in order to place a fresh flash bulb into an optimum position for illumination of the subject. An important advantage of such mounting of the clamp 30 is that friction between its internal surface and the peripheral surface of the coupling element 7 decreases when the clamp turns counterclockwise with reference to the peripheral surface and that such friction increases when the clamp turns in a clockwise direction to index the socket 3. This will be readily understood because, when the clamp 30 turns in a counterclockwise direction, the pin 24 pulls the eye 31 away from the axis of the socket 3 and thereby reduces the area of frictional engagement between the clamp and the coupling element 7. On the other hand, and when the clamp 30 turns in a clockwise direction, the pin 24 pushes the eye 31 toward the axis of the socket 3 and thus causes the entire internal surface of the clamp to bear against the peripheral surface of the coupling element 7. In other words, the force with which the clamp 30 tends to rotate the socket 3 is greater when the clamp turns in the direction indicated by arrow a.

Without further analysis, the foregoing will so fully reveal the gist of the present invention that others can, by applying current knowledge, readily adapt it for various applications without omitting features which fairly constitute essential characteristics of the generic and specific aspects of our contribution to the art and, therefore, such adaptations should and are intended to be comprehended within the meaning and range of equivalence of the claims.

We claim:

1. In a photographic camera, a combination comprising a housing; illuminating a housing; illuminating means including an indexible member rotatably mounted in said housing to permanently prevent rotation of said indexible member in a first direction while permitting its rotation in a second direction; and means for rotating said indexible member in said second direction, comprising drive means including a turnable drive member journaled in said housing, a crank unit receiving motion from said drive member, and friction coupling means interposed between said crank unit and said indexible member, said friction coupling means comprising a first coupling element rigid with said indexible member and a second coupling element frictionally engaging said first coupling element, said crank unit comprising a reciprocable member connected in the region of one end thereof to said turntable drive member and in the region of the other end thereof to said second coupling element to turn the latter alternately in said first and second directions while said crank unit receives motion from said turnable drive member whereby said second coupling element tends to turn said indexible member in said first and second directions by way of said first coupling element and the turning of said indexible member in said first direction is prevented by said one-way clutch means so that the indexible member turns in said second direction in response to movement of said reciprocable member.

2. A combination as defined in claim 1, wherein said crank unit is flat.

3. A combination as defined in claim 1, wherein said one-way clutch means comprises a toothed wheel rigid with said indexible member and a spring-biased pawl cooperating with the teeth of said wheel.

4. A combination as defined in claim 3, wherein said pawl is turnable in said housing about a fixed axis.

5. In a photographic camera, a combination comprising a housing; illuminating means including an indexible member rotatably mounted in said housing; one-way clutch means provided in said housing for holding said indexible member against rotation in a first direction; and means for rotating said indexible member in a second direction, comprising drive means including a rotary member journaled in said housing, a crank unit receiving motion from said rotary member, and friction coupling means interposed between said crank unit and said indexible member, said friction coupling means comprising a first coupling element rigid with said indexible member and having a cylindrical peripheral surface and an elastic second coupling element having a second surface surrounding and frictionally engaging a substantial portion of said cylindrical surface, said crank unit comprising a reciprocable member connected with said second coupling element to turn the latter in said first and second directions whereby said second coupling element rotates said first coupling element and said indexible member only when it rotates in said second direction.

6. In a photographic camera, a combination comprising a housing; illuminating means including an indexible member rotatably mounted in said housing; one-way clutch means provided in said housing for holding said indexible member against rotation in a first direction; and means for rotating said indexible member in a second direction, comprising drive means including a rotary shaft remote from said indexible member and journaled in said housing, a crank unit receiving motion from said shaft, and friction coupling means interposed between said crank unit and said indexible member, said crank unit comprising a carrier provided on said shaft, a crank pin eccentrically mounted on said carrier, a crank arm having one end articulately connected with said crank pin, and means connecting the other end of said crank arm with said friction coupling means.

7. In a photographic camera, a combination comprising a housing; illuminating means including an indexible member rotatably mounted in said housing; one-way clutch means provided in said housing for holding said indexible member against rotation in a first direction; and means for rotating said indexible member in a second direction, comprising drive means including a rotary output member journaled in said housing, a crank unit receiving motion from said output member, and friction coupling means interposed between said crank unit and said indexible member, said friction coupling means comprising a first coupling element rigid with said indexible member and having a cylindrical peripheral surface and a second coupling element consisting of elastomeric material and frictionally engaging said peripheral surface, said second coupling element having two elastic arms straddling said peripheral surface and an intermediate portion connected with said crank unit.

8. In a photographic camera, a combination comprising a housing; illuminating means including an indexible member rotatably mounted in said housing; one-way clutch means provided in said housing for holding said indexible member against rotation in a first direction; and means for rotating said indexible member in a second direction, comprising drive means including a rotary output member journaled in said housing, a crank unit receiving motion from said output member, and friction coupling means interposed between said crank unit and said indexible member, said friction coupling means comprising a first coupling element rigid with said indexible member and having a cylindrical peripheral surface and a second coupling element consisting of elastomeric material and frictionally engaging said peripheral surface, said second coupling element having a first portion coupled with said crank unit and a second portion straddling said peripheral surface and extending from said first portion in said first direction.

9. A combination as defined in claim 1, wherein said second coupling element is elastic.